United States Patent [19]

Maeda et al.

[11] Patent Number: 4,982,707
[45] Date of Patent: Jan. 8, 1991

[54] AUTOMOTIVE VEHICLE VIBRATION CONTROL ARRANGEMENT

[75] Inventors: Ryoichi Maeda, Fujisawa; Yuzo Kadomukai; Makoto Yamakado, both of Shimoinayoshi, all of Japan

[73] Assignees: Nissan Motor Co., Ltd., Yokohama; Hitachi, Ltd., Tokyo, both of Japan

[21] Appl. No.: 482,958

[22] Filed: Feb. 21, 1990

[30] Foreign Application Priority Data

Feb. 27, 1989 [JP] Japan .................................. 1-45718

[51] Int. Cl.⁵ ............................................. F02B 75/06
[52] U.S. Cl. ................................................ 123/192 B
[58] Field of Search ............... 123/192 R, 192 B, 425, 123/435

[56] References Cited

U.S. PATENT DOCUMENTS 4,800,500 9/1989 Tanaka ................................. 123/425
4,928,652 5/1990 Shinya et al. ........................ 123/425

FOREIGN PATENT DOCUMENTS 58-217742 12/1983 Japan .
59-196950 11/1984 Japan .
59-188617 4/1986 Japan .............................. 123/192 B
61-149538 7/1986 Japan .
61-149539 7/1986 Japan .
61-200333 9/1986 Japan .

Primary Examiner—Noah P. Kamen
Attorney, Agent, or Firm—Foley & Lardner, Schwartz, Jeffery, Schwartz, Mack, Blumenthal & Evans

[57] ABSTRACT

In order to suppress vibrations which are produced by engine misfiring during idling, the load on an alternator is momentarily increased with a given time after the detection of a misfire as detected by a cylinder pressure sensor.

8 Claims, 5 Drawing Sheets

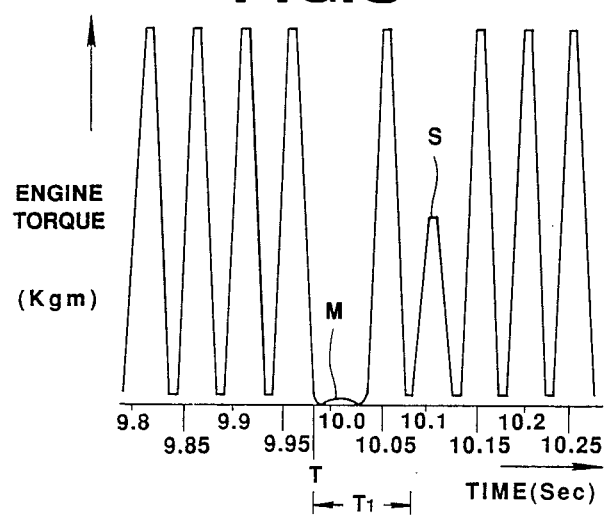
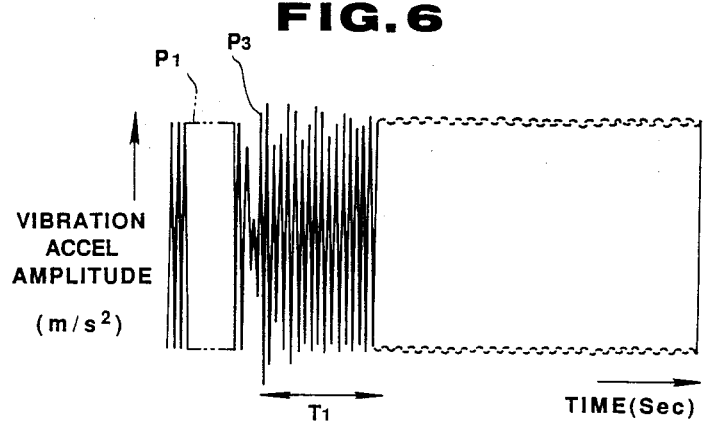
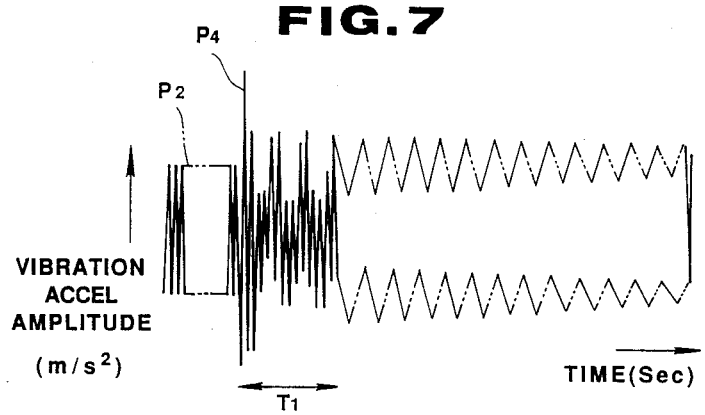

AUTOMOTIVE VEHICLE VIBRATION CONTROL ARRANGEMENT

BACKGROUND OF THE INVENTION

1. Field of the Invention

The present invention relates to automotive engines and more specifically to an arrangement which reduces vibration produced by sudden fluctuations in the engine output torque.

2. Description of the Prior Art

In previously proposed engine torque output control arrangements, the torque fluctuations have been sensed at the crank shaft and in response to this the amount of current which passes through a field coil of an alternator associated with the engine, has been varied in a manner to vary the reverse torque which is applied to the engine crank shaft in an attempt to reduce the vibration producing effect of the output torque fluctuations.

In this type of arrangement, the amount of current which flows through the field coil is related to the level of the voltage which is produced. However, with this arrangement as the variation in the inductance component of the alternator field occurs after a finite delay, it has been very difficult to actually establish the appropriate voltage and adequately control the torque fluctuations.

Another proposal disclosed in JP-A No. 61-20333 has made use of a generator/motor arrangement which is directly connected to the engine crankshaft. In this arrangement the angular speed of the crankshaft has been sensed and the direct current (DC) supplied from the battery is converted into a multi-phase alternating current (AC) and supplied to the armature coil of the generator/motor device. In the armature coil the alternating current is converted to direct current and used to charge the battery. During this process, in the event that the angular speed of the crank shaft is sensed as being less than a predetermined reference value, the phase of the multi-phase current which is supplied to the armature coil is advance in accordance with the amount of difference between the instant angular speed of the crank shaft and the above mentioned reference value. On the other hand, in the event that the angular speed of the crank shaft is found to be greater than the reference value, the supply of multi-phase alternating current to the armature coil is controlled by a shut-off device.

This arrangement is such that while sudden strong reversals in torque can be controlled, its effect is limited to situations wherein momentary increases in torque occur. Accordingly, in the case of a misfire wherein a momentary reduction in torque takes place, adequate control of the fluctuation cannot be expected and as a result, vibration containing a given frequency which tends to have a disturbing influence on the passengers of the vehicle, tends to transmitted to the vehicle chassis.

SUMMARY OF THE INVENTION

It is an object of the present invention to provide an arrangement which can detect misfiring and counter the effect which tends to be produced by the vibration generated by the improper combustion by temporarily increasing the load on the engine a given time after each detection.

More specifically, a first aspect of the present invention is deemed to comprise a vibration control arrangement for an automotive vehicle which features: means for sensing the combustion pressure; means for monitoring the sensed combustion pressure and determining an improper combustion has occurred; and means for momentarily varying the engine output torque a predetermined time after the detection of an improper combustion.

A second aspect of the present invention is deemed to comprise a vibration control arrangement for an automotive vehicle having an engine which includes a combustion chamber, the vibration control arrangement featuring: means for sensing the pressure in the combustion chamber; means for monitoring the sensed pressure and determining if an improper combustion has occurred; a device operatively connected with the engine to be driven thereby, the device placing a load on the engine; control means responsive to the monitoring means for momentarily increasing the load placed on the engine by the device and thus varying the engine output torque, a predetermined time after the detection of an improper combustion.

A third aspect of the present invention is deemed to comprise a method of negating the vibration inducing effect of engine misfiring on the vibration of a vehicle chassis, the method featuring the steps of: sensing the pressure in a combustion chamber of the engine; detecting if a misfire in the combustion chamber has occurred; momentarily increasing the load on the engine in a manner to reduce the amount of torque which is produced a predetermined time after the detection of the misfire.

A fourth aspect of the invention is deemed to comprise a vehicle which features a chassis; a vehicle suspension which suspends the vehicle on a road surface, the chassis and vehicle suspension defining a system having a natural frequency; an engine having a combustion chamber; an engine support arrangement which supports the engine on the chassis; means for sensing the pressure in the combustion chamber; means for monitoring the sensed pressure and determining if an improper combustion has occurred; a device operatively connected with the engine to be driven thereby, the device placing a load on the engine; and control means responsive to the monitoring means for momentarily increasing the load placed on the engine by the device and thus varying the engine output torque, a predetermined time after the detection of an improper combustion so as to produce a vibration which negates the vibration which is produced by the improper combustion and which tends to be transmitted to said chassis and induced motion therein.

BRIEF DESCRIPTION OF THE DRAWINGS

FIG. 5 is a graph showing an example of the operation of the present invention, in terms of engine output and time;

FIGS. 6-9 are examples of various vibrational wave forms;

DETAILED DESCRIPTION OF THE PREFERRED EMBODIMENT

Figure 1:
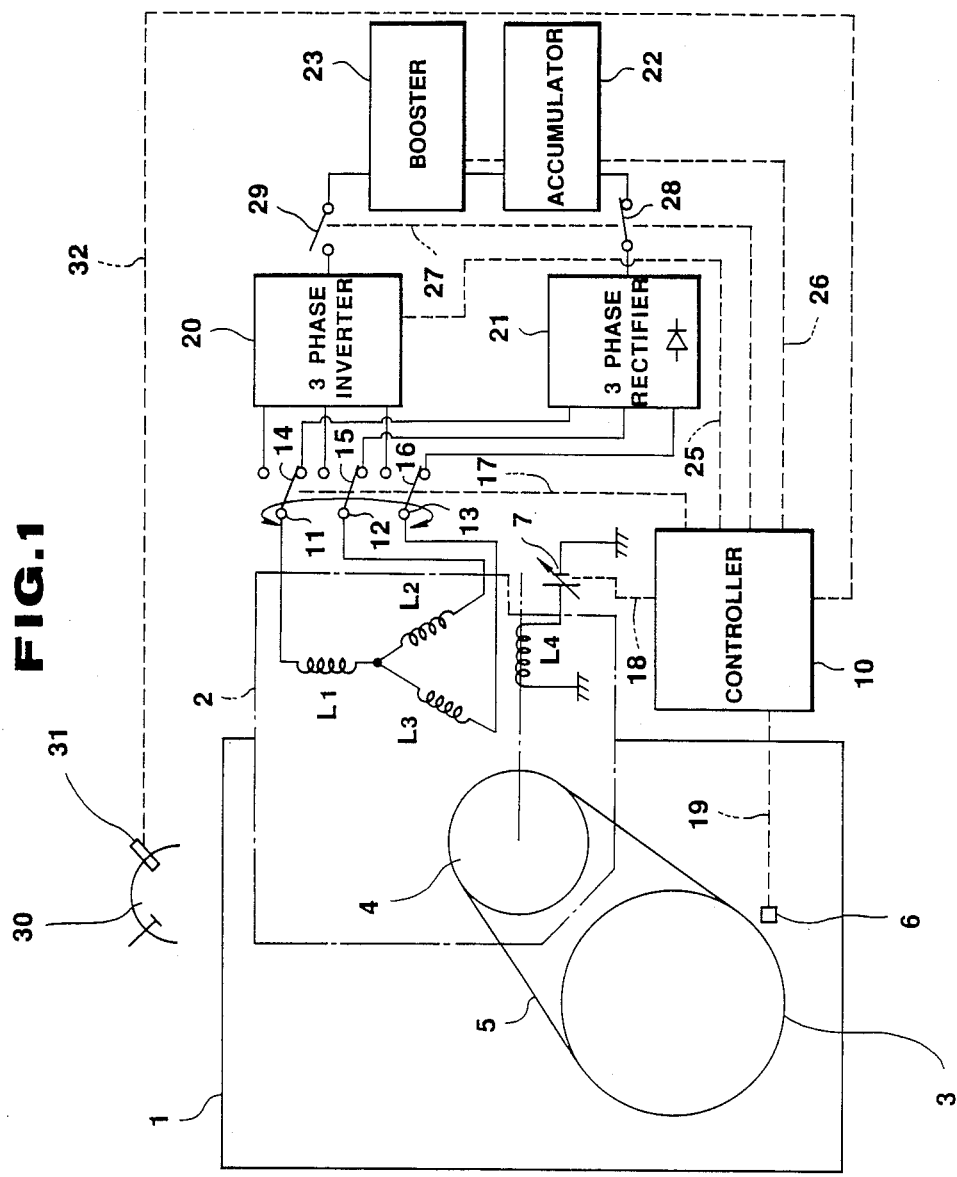
FIG. 1 is a schematic block diagram showing the basic arrangement of a first embodiment of the present invention.

FIG. 1 shows a first embodiment of the present invention. In this arrangement an engine block 1 supports an alternator 2. A drive connection is established between a crank pulley 3 and an alternator pulley 4 by way of suitable belt 5.

A crank angle sensor 6 is arranged to sense the rotational characteristics of the engine crank shaft. The alternator 2 includes three rotatable armature coils L1 to L3 and a field coil L4. The field coil L4 is connected to a battery 7.

A controller 10 is operatively connected with switches 14–16 which are in turn arranged to selectively connected output terminals 11–13 of the above mentioned armature coils L1–L3, with a three phase inverter 20. The controller 10 is further connected with the battery 7 and crank angle sensor 6 by signal lines 18 and 19, respectively.

A three phase flow rectifier 21, an accumulator 22, and a step-up booster 23 are connected in the illustrated manner.

A signal line 17 provides an operative connection between the controller 10 and the switches 14–16; a signal line 25 connects the three phase inverter 20 with the controller 10; and a signal line 26 provide a connection between the controller 10 and accumulator 22.

A switch 28 enables a selective connection between the three phase rectifier 21 and the accumulator 22. A switch 29 provides a selective connection between the three phase inverter 20 and the step up booster 23. The switches 28, 29 operatively connected with the controller 10 via signal line 27.

A combustion pressure sensor 31 is operatively arranged with the combustion chamber 30 of the engine and arranged to output a signal along line 32 to the controller 10.

It should be noted that in the case of a multi-cylinder engine, each cylinder is provided with a combustion pressure sensor to enable the detection of any abnormal combustion and the introduction of a momentary reduction in engine output torque a predetermined short time after such a detection.

By way of example, the pressure sensor 31 may take the form of piezoelectric element which is sandwiched between the cylinder head and a spark plug and thus subject to changes in stress which vary with the pressure which develops within the combustion chamber 30.

The basic operation of the above described arrangement is such that when the engine is running properly, the belt 5 transfers rotational energy from the engine crank shaft pulley 3 to the alternator pulley 4 and the electrical power which is produced by the alternator 2 and which has a predetermined voltage, is supplied to the battery 7.

Figure 2:
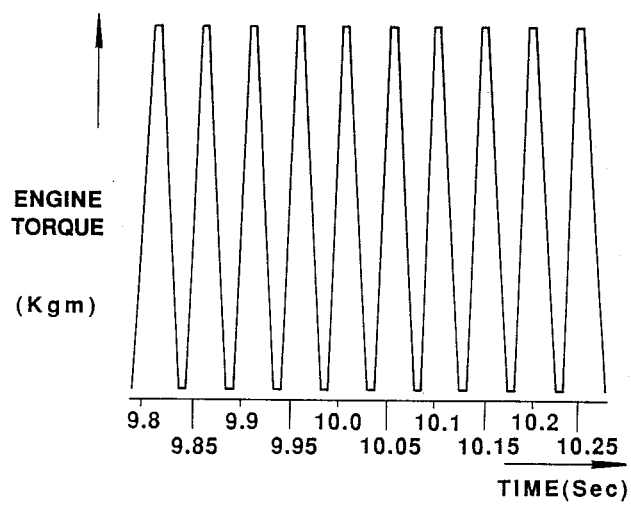
FIGS. 2 and 3 are graphs showing in terms of engine torque and time, two examples of engine torque output characteristics.

During the above operation, the air/fuel charges in the combustion chamber are ignited and resulting torque is applied to the engine crankshaft. FIG. 2 shows the pulse-like nature with which torque is generated under such circumstances. Viz., when the engine is running normally and without the occurrence of an abnormal combustion, there is very little cycle to cycle variation in the torque impulse generation.

Figure 3:
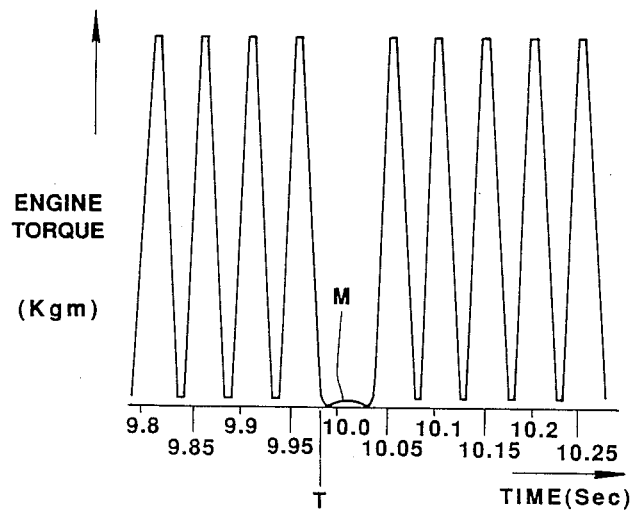

However, in the case that a misfire, partial misfire or the like type of improper combustion occurs, the peak pressure which develops in the combustion chamber in question is greatly reduced. By way of example, as shown in FIG. 3 at a time T, a misfire takes place and the engine torque M which is produced in response to this abnormal combustion, assumes a negligible value and creates a relatively large gap between impulse peaks.

This gives rise to vibration having a frequency which tends to be close to the natural frequency of one of the arrangement which suspends the engine on the chassis or the chassis suspension arrangement.

Figure 11:
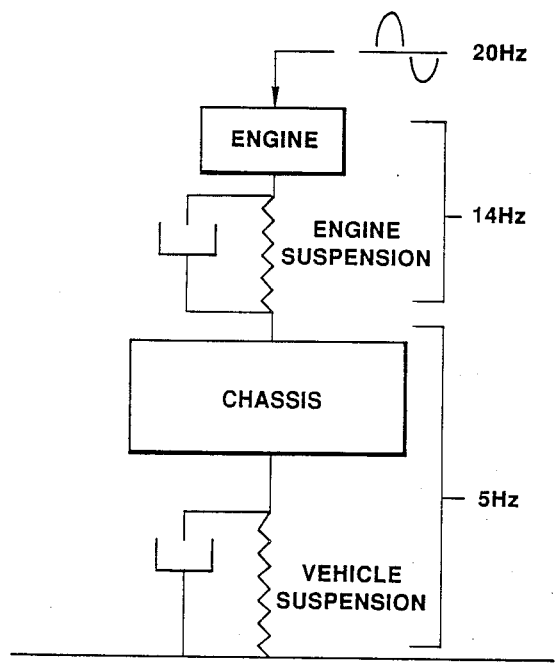
FIG. 11 is a model showing an arrangement wherein an engine is mounted on a vehicle chassis.

Merely by way of example, assume that, as shown in FIG. 11, when a four cylinder engine is idling it produces a frequency in the region of 20 Hz; the predominant frequency produced by the engine is so called secondary vibration; engine suspension arrangement in this instance has a natural frequency of about 14 Hz while the chassis suspension system a natural frequency of about 5 Hz.

In the event that one of the cylinders (merely by way of example) begins to misfire due to plug failure or the like, the frequency with which the misfires occur tends to be about 5 Hz. The vibration which results from the misfiring therefore has a frequency which is close to the natural frequency of the chassis/vehicle suspension system. This frequency tends to undergo little attenuation by the engine suspension arrangement and thus is transmitted to the chassis.

Generally speaking, the vehicle suspension system exhibits the weakest resistance to motion in the roll direction. Accordingly, in the above mentioned case, a the frequency with which the impulses produced by this "rough idling" vibration tends to coincide with the natural frequency of the vehicle suspension arrangement, rolling of the vehicle tends to be excited by the same.

Of course misfiring is not limited to one or more specific cylinders and in the event of poor air fuel ratio control which permits excessively lean mixtures to be fed to the cylinders of the engine, sporadic misfiring can occur. However, the possibility that the vibrations produced by such misfiring will exhibit a frequency in the 5–7 Hz region which is close to one of the natural frequencies of the engine and/or vehicle suspension arrangements, the chances of the same inducing a somewhat amplified unpleasant result exists.

In accordance with the instant embodiment, in response to the output of the pressure sensor 31 indicative of the misfire and the signal from the crank angle sensor 6, the controller 10 responds by determining the degree of the combustion abnormality and momentarily increases the amount of current which is supplied through line 18 to field coil L4 from the battery 7 is momentarily increased.

Figure 4:
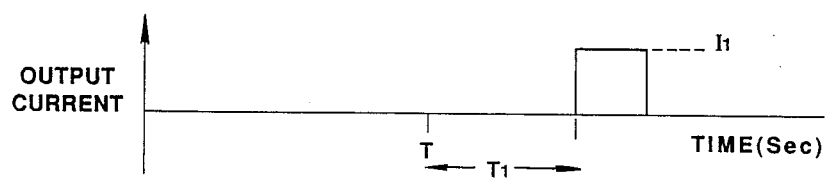
FIG. 4 is a timing chart showing a control pulse which is produced in accordance with the present invention.

As shown in FIG. 4, the timing of this current flow increase is such that it induced to occur a predetermined time T1 after time T. The time T1 is selected to coincide with half a cycle of the natural frequency of the engine suspension system. This therefore tends to produce a vibration which exhibits a phase which is the reverse of that which tends to be produced by the misfire(s). As shown in FIG. 5, at time T1 following the misfire, an engine torque S having a phase which is essentially the reverse of that produced by the misfire, is generated.

The torque S is such as to cancel the vibration which tends to transmitted to the vehicle chassis and induce the aforementioned rolling.

The above described control is used only during engine idling and is not executed when the vehicle is running (viz., being accelerated, decelerated, undergoing cruising or the like).

With the instant embodiment, the power which is produced by the rotation of armature coils L1, L2 and L3 is, under the conditions illustrated in FIG. 1, is temporarily supplied from the 3 phase rectifier 21 via the switch 28 to the accumulator 22. Following this, switches 14, 15, 16 and 29 are closed (ON) while switch 28 is opened (OFF). Under these conditions the power which is stored in the accumulator 22 is fed via the booster 23 to the 3 phase inverter and returned to the armature coils L1, L2 & L3.

In accordance with the operation described above, the power loss is reduced to zero and the detrimental effect on the fuel economy of the engine totally negated.

FIGS. 6 and 7 show experimental data which depicts two examples of vibration generation which are produced under identical engine operating conditions, and the effect of the present invention thereon. The engine in this case is a four cylinder engine.

As will be appreciated FIG. 6 shows an example wherein the vibration acceleration amplitude P1 which is produced by normal engine operation is large (in the above mentioned roll direction) and is interrupted by a misfire induced change P3. On the other hand, FIG. 7 shows the situation wherein a small amplitude P2 is interrupted by a misfire at P4.

As shown, after time T1 the effect of the invention is such as to suppress any notable fluctuations and negate the effect of the misfires.

Figure 8:
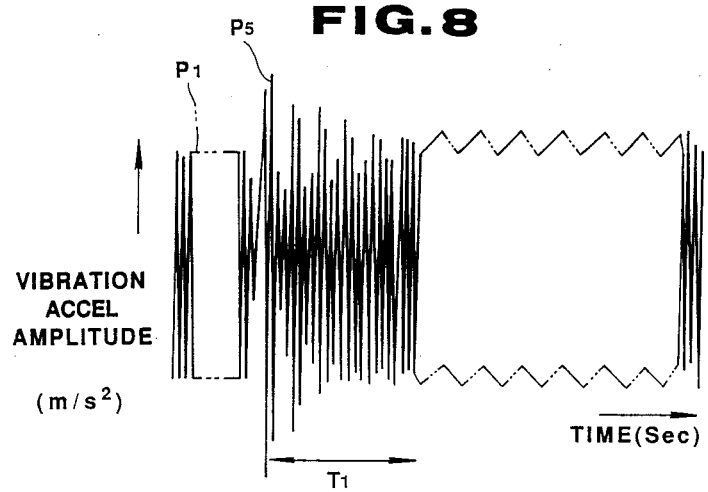
Figure 9:
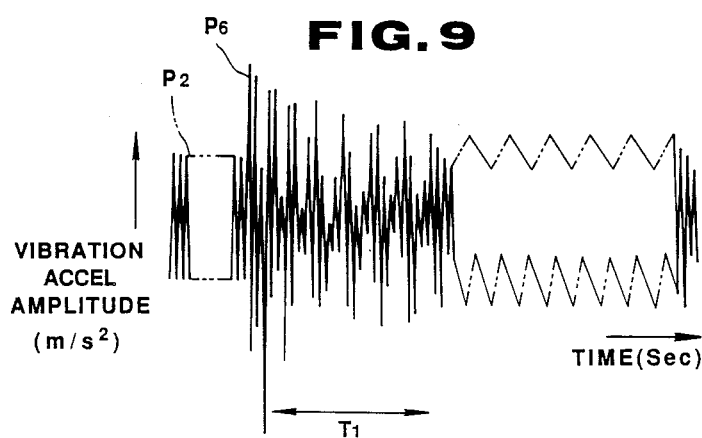

FIGS. 8 and 9 show similar data. As will be noted, in all of the above instances suppression of vibrational influence on the rolling of the vehicle occurs following the expiry of time T1.

It will be noted that with the disclosed embodiment, by increasing the amount of electrical power produced one engine revolution after a misfire, it is possible to achieve a 5 db reduction in vehicle vibration.

Figure 10:
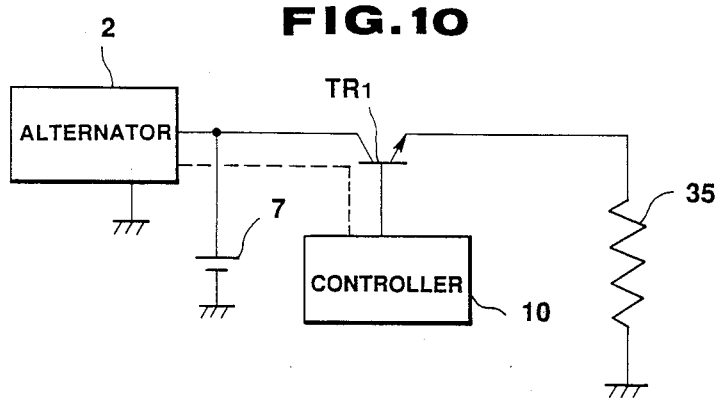
FIG. 10 is a schematic block diagram showing the basic arrangement of a second embodiment of the present invention.

A second embodiment of the present invention is shown in FIG. 10. In this arrangement the alternator 2 is connected with a load 35 (in this instance a rear window de-fogger heating wire arrangement) by way of transistor TR1. Controller 10 is arranged to be responsive to the engine crank angle and to render the transistor TR1 conductive with a predetermined rotational angular delay with respect to the ignition timing in the event that a misfire is detected.

As will be noted, the load which is used in the second embodiment is not limited to the above mentioned defogger and can take the form of any suitable load which available.

As a further alternative it is possible to observe the fluctuations in the engine rotation and use this parameter in lieu of the combustion pressure if so desired.

For further disclosure relating to a manner in which the presence or absence of a misfire can be detected, reference may be had to U.S. Ser. No. 07/442,420 filed on Nov. 24, 1989 (continuation of U.S. Ser. No. 07/094,761 filed on Sept. 10, 1987) in the name of ABO et al.

This document discloses a technique of sampling the pressure in the combustion chamber and determining a crank angle at which the total effect of the sampled pressures could be deemed to have instantly acted (analogous to the center of gravity of a mass). This technique permits the discrimination between the motoring pressure and combustion induced pressure and thus enables misfiring to be accurately identified during idling.

What is claimed is:

1. A vibration control arrangement for an automotive vehicle having an engine which includes a combustion chamber, comprising:
    means for sensing the pressure in said combustion chamber;
    means for monitoring the sensed pressure from the sensing means and determining if an improper combustion has occurred;
    a device operatively connected with said engine to be driven thereby, said device placing a load on said engine;
    control means responsive to said monitoring means for momentarily increasing the load placed on said engine by said device and thus varying the engine output torque, a predetermined time after the detection of an improper combustion.

2. A vibrational control arrangement as claimed in claim 1 wherein said device comprises an alternator.

3. A vibrational control arrangement as claimed in claim 2 wherein said control means comprises:
    a crank angle sensor;
    a controller operatively connected with said crank angle sensor and a battery which is operatively connected with said alternator;
    a three phase inverter;
    a three phase rectifier, said three phase rectifier and said three phase inverter being selectively and alternatively connectable to armature coils of said alternator via a plurality of first switches, said plurality of first switches being operatively connected with said controller;
    an accumulator for storing electrical energy; and
    a booster circuit for increasing the voltage of the electrical energy supplied thereto, said booster circuit being serially connected with said booster circuit, said accumulator being operatively connected with said three phase rectifier by way of a second switch, said booster circuit being operatively connected with said three phase inverter by way of a third switch, said second and third switches being operatively connected with said controller to be selectively opened and closed thereby.

4. A vibrational control arrangement as claimed in claim 1 wherein said device comprises:
    an electrical load;
    an alternator operatively connected with the engine to be driven thereby; and
    switch means for temporarily connecting said alternator to said electrical load in a manner which increases the load on said engine.

5. A vibration control arrangement for an automotive vehicle which has an engine including a combustion chamber, comprising:
    means for sensing the combustion pressure in the combustion chamber;
    means for monitoring the sensed combustion pressure from the sensing means and determining if an improper combustion has occurred; and
    means responsive to the monitoring means for momentarily varying the engine output torque a predetermined time after the detection of an improper combustion.

6. In a vehicle
a chassis;
a vehicle suspension which suspends the vehicle on a road surface, said chassis and vehicle suspension defining a system having a natural frequency;
an engine having a combustion chamber;
an engine support arrangement which supports the engine on said chassis;
means for sensing the pressure in said combustion chamber;
means for monitoring the sensed pressure and determining that an improper combustion has occurred;
a device operatively connected with said engine to be driven thereby, said device placing a load on said engine; and
control means responsive to said monitoring means for momentarily increasing the load placed on said engine by said device and thus varying the engine output torque, a predetermined time after the detection of an improper combustion so as to produce a vibration which negates the vibration which is produced by the improper combustion, wherein the frequency of the improper combustion vibration is close to that of said natural frequency.

7. A method of negating the vibration inducing effect of engine misfiring on the vibration of a vehicle chassis, comprising the steps of:
sensing the pressure in a combustion chamber of said engine;
detecting a misfire in said combustion chamber;
momentarily increasing the load on the engine in a manner to reduce the amount of torque which is produced a predetermined time after the detection of the misfire.

8. A method as claimed in claim 7 wherein said step of momentarily increasing the load comprises:
using an alternator; and
temporarily increasing the amount of electrical energy produced by said alternator to the degree of momentarily suppressing the amount of torque which is output from the engine.

* * * * *